(12) United States Patent
Larus et al.

(10) Patent No.: US 6,327,699 B1
(45) Date of Patent: Dec. 4, 2001

(54) WHOLE PROGRAM PATH PROFILING

(75) Inventors: James R. Larus, Mercer Island; Christopher W. Fraser, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/302,854

(22) Filed: Apr. 30, 1999

(51) Int. Cl.$^7$ .................................................. G06F 9/45
(52) U.S. Cl. ........................................ 717/4; 717/7; 717/8
(58) Field of Search ................... 717/4, 7, 8, 9; 702/119; 703/23; 714/15

(56) References Cited

U.S. PATENT DOCUMENTS

| | | | |
|---|---|---|---|
| 5,067,073 | * 11/1991 | Andrews | 714/38 |
| 5,161,216 | * 11/1992 | Reps et al. | 717/4 |
| 5,355,487 | * 10/1994 | Keller et al. | 717/4 |
| 5,828,883 | * 10/1998 | Hall | 717/4 |
| 5,896,538 | * 4/1999 | Blandy et al. | 717/4 |
| 5,950,009 | * 9/1999 | Bortnikov et al. | 717/9 |
| 5,999,736 | * 12/1999 | Gupta et al. | 717/9 |
| 6,070,009 | * 5/2000 | Dean et al. | 717/4 |
| 6,151,706 | * 11/2000 | Lo et al. | 717/9 |
| 6,170,083 | * 1/2001 | Tabatabai | 717/9 |

OTHER PUBLICATIONS

Hall, "Call path profiling", ACM pp 296–306, Jun. 1992.*
Larus, "Whole program paths", ACM SIGPLAN, pp 259–269, May 1999.*
Ball, "Effiicently counting program events with support for online queries", ACM TPLS, pp 1399–1410, vol. 16, No. 5, Sep. 1994.*
Ionnidis et al, "Transitive closure algorithms based on graph traversal", ACM Trans. Database Sys. vo. 18, No. 3, pp 512–576, Sep. 1993.*
Ammons, G., et al., "Exploiting Hardware Performance Counters with Flow and Context Sensitive Profiling", *Proceedings of the 1997 ACM SIGPLAN Conference on Programming Laguage Design and Implementation (PLDI)*, vol. 32, No. 5, pp. 85–96, (May 1997).

(List continued on next page.)

*Primary Examiner*—Mark R. Powell
*Assistant Examiner*—Anil Khatri
(74) *Attorney, Agent, or Firm*—Merchant & Gould P.C.

(57) ABSTRACT

A program is instrumented to record acyclic paths during execution of the program. A whole program path is produced from the record and provides a complete compact record of a program's entire control flow. It includes a record of crossing loop boundaries and procedure boundaries to provide a complete picture of the program's dynamic behavior. A string compression algorithm that constructs a context-free grammar is used to compress the path trace and uncover its regular structure. Heavily executed subpaths are easily identified from the representation by traversing the whole program path to find hot subpaths according to input parameters of minimum and maximum path lengths and a minimum cost.

40 Claims, 9 Drawing Sheets

OTHER PUBLICATIONS

Ammons, G., et al., "Improving Data–flow Analysis with Path Profiles", *Proceedings of the 1998 ACM SIGPLAN Conference on Programming Language Design and Implementation (PLDI)*, pp. 72–84.

Baker, B.S., "Parameterized Duplication in Strings: Algorithms and an Application to Software Maintenance", *Society for Industrial and Applied Mathematics Journal on Computing*, 26 (5), pp. 1343–1362, (1997).

Ball, T., "Efficient Path Profiling", *Proceedings of the 29th Annual IEEE/ACM International Symposium on Microarchitecture*, pp. 46–57, (Dec. 1996).

Ball, T., et al., "Edge Profiling versus Path Profiling: The Showdown", *Conference Record of POPL '98: The 25th ACM SIGPLAN–SIGACT Symposium on Principles of Programming Languages*, pp. 134–148, (Jan. 1998).

Bodik, R., et al., "Refining Data Flow Information Using Infeasible Paths", *6th European Software Engineering Conference, 5th ACM SIGSOFT Symposium on the Foundations of Software Engineering*, pp. 361–377, (1997).

Fisher, J.A., "Trace Scheduling: A Technique for Global Microcode Compaction", *IEEE Transactions on Computers, C–30* (7), pp. 478–490, (Jul. 1981).

Fisher, J.A., et al., "Parallel Processing: A Smart Compiler and a Dumb Machinep", *Proceedings of the SIGPLAN '84 Symposium on Compiler Consturction*, 19 (6), pp. 37–47, (Jun. 1984).

Gupta, R., et al., "Path Profile Guided Partial Dead Code Elimination Using Predication", *Proceedings—1997 International Conference on Parallel Architectures and Compilation Techniques—IEEE Computer Society*, pp. 102–113, (1997).

Jacobson, Q., et al., "Path–Based Next Trace Prediction", *Proceedings for the Thirtieth Annual IEEE/ACM International Syposium on Microarchitecture*, pp. 14–23, (Dec. 1997).

Larus, J.R., "EEL: Machine–Independent Executable Editing", *ACM SIGPLAN Notices, 30* (6), pp. 291–300, (Jun. 1995).

Melski, D., et al., "Interprocedural Path Profiling", *Compiler Construction, 8th International Conference*, pp. 47–62, (Mar. 1999).

Mosberger, D., et al., "Making Paths Explicit in the Scout Operating Systems", *Usenix Association, Proceedings of the Second USENIX Symposium on Operating Systems Design and Implementation (OSDI), vol. 30*, pp. 153–167, (Oct. 1996).

Nevill–Manning, C.G., et al., "Compression and Explanation using Hierarchical Grammars", *The Computer Journal, 40* (2/3), pp. 103–116, (1997).

Nevill–Manning, C.G., et al., "Linear–time, incremental hierarchy inference for compression", *Proceedings of the DCC '97 Data Compression Conference, IEEE*, pp. 3–11, (Mar. 1997).

Pu, C., et al., "Optimistic Incremental Specialization: Streamlining a Commercial Operating System", *Proceedings of the Fifteenth ACM Symposium on Operating Systems Principles*, 10 pages, (Dec. 1995).

Rotenberg, E., et al., "Trace Cache: a Low Approach to High Bandwidth Instruction Fetching", *Proceedings of the 29th Annual IEEE/ACM International Symposium on Microarchitecture*, pp. 24–34, (Dec. 1996).

Rotenberg, E., et al., "Trace Processors", *Proceedings—Thirthieth Annual IEEE/ACM Interantional Symposium on Microarchitecture*, pp. 138–148, (1997).

Srivastava, A., et al., "ATOM, A System for Buidling Customized Program Analysis Tools", *ACM SIGPLAN Notices, 29* (6), pp. 196–205, (Jun. 1994).

* cited by examiner

| OpCode | Operation |
|---|---|
| EnterRoutine(ID) | Subsequent paths execute in routine ID |
| LeaveRoutine() | Leave current routine and return to previous one |
| NewPath(ID) | Path ID executed |
| EnterThread(ID) | Subsequent paths execute in thread ID |

FIG. 4

```
while input is not empty do
  c <- next input character
  append c to start rule S while property is violated do
    // Digram uniqueness property:
    if digram D occurs twice (no overlap) then
      if one occurance of D is RHS of rule R then
        replace other occurance with LHS of R
      else
        create new rule R' with RHS D
        replace both occurences of D by LHS of R'
      endif
    // Rule utility property:
    if rule R is only referenced once then
      replace use of R by RHS of R
      delete R
    endif
  od
od
```

FIG. 5

```
void ReportHotSubPaths(Rule* rule, int mark) {
   if (rule->Mark() != mark) {                   // First time visiting rule
      rule->SetMark(mark);

rule->SetPrefix(new LLimitedString(MaxStringLength)); // Prefix of this rule
      LLimitedString* subPath = new LLimitedString(MaxStringLength); // Subpath thru
      rule // Iterate over successors in DAG (non-terminals on RHS of rule)
      for (Symbol* sym = rule->RHS()->FirstSym(); !rule->RHS()->Done(sym); sym = sym->Next())
      {
         if (sym->IsTerminal())
            appendTerminal (rule, subPath, sym);   // Symbols are just appended to subpath
         else {
            Rule* symRule = sym->InRule();
            ReportHotSubPaths(symRule, mark);      // Postorder: find subpaths in successor appendTerminalString (rule, subPath, symRule->Prefix());

if (!symRule->Prefix()->CoversNode())
               *subPath = *symRule->Suffix();      // Node is wider than prefix, so change
               suffix if (symRule->IncrNumPredecessors(-1) == 0) {
               delete symRule->Prefix();           // Free strings after last use
               delete symRule->Suffix();
            }
         }
      }
      rule->SetSuffix(subPath);
   }
}
```

FIG. 8A

```
void appendTerminalString(Rule* rule, LLimitedString* subPath, LLimitedString* string)
{
    for (int i = 0; i < string->Length(); i += 1)
        appendTerminal(rule, subPath, (*string)[i]);
}
void appendTerminal (Rule* rule, LLimitedString* subPath, Symbol* sym) {
    appendTerminalToRulePrefix (rule, sym);
    appendTerminalToSubPath (rule, subPath, sym);
}
void appendTerminalToRulePrefix(Rule* rule, Symbol* sym) {
    if (rule->Prefix()->Length() < MaxStringLength)
        rule->Prefix()->Append (sym, this);
    else
        rule->Prefix()->SetCoversNode(false);
}
void appendTerminalToSubPath (Rule* rule, LLimitedString* subPath, Symbol* sym) {
    subPath->Append(sym, this);
    int expense = subPath->Cost() *Frequency(rule);
    if (MinCost <= expense && MinStringLength <= subPath->Length()) {
        print subPath;
        subPath->Clear();
        rule->Prefix()->Freeze(subPath->Length());   // Stop before hot subpath
    }
}
```

FIG. 8B

WHOLE PROGRAM PATH PROFILING

FIELD OF THE INVENTION

This invention relates generally to the field of program path profiling and in particular to whole program path profiling.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Microsoft Corporation, All Rights Reserved.

BACKGROUND OF THE INVENTION

A challenge facing computer architects, compiler writers, and programmers is to understand the dynamic behavior of a program. A program's performance is directly related to the events that occur while the program is executing. One way to increase program performance is to understand the dynamic behavior of a program and improve costly or frequently occurring portions of that program.

Program paths or traces are sequences of consecutively executed program blocks of instructions. These program paths or traces have provided programmers a window into a program's dynamic behavior by capturing aspects of a program's dynamic control flow, not just its aggregate behavior. Using these paths, programmers, compiler writers, and computer architects are provided with a way to improve performance. Programmers or compilers are able to identify heavily executed paths and tune them so that they perform faster.

Performance of large, complex systems, such as operating system and databases have been improved by identifying heavily executed paths and streamlining them into fast paths. In compilers as well, trace scheduling and, more recently, path-based compilation, demonstrate that program optimization can benefit from a focus on a program's dynamic control flow. Recently designed computer architectures have also directly exploited traces or program flow to enhance instruction caching and execution.

Path profiling measures the frequency and cost of a program's executed paths. It is an essential technique to understand a program's control flow. However, current path profiling techniques normally only capture acyclic paths. Acyclic paths are short parts of a program's execution that, unfortunately, end at loop iteration and procedure boundaries, which are two of the most interesting points in a program's execution. Current techniques for path profiling are useful to programmers, but do not easily describe the program's flow through procedure boundaries and loop iterations. Without tools to conveniently identify expensive interprocedural paths, it is difficult to improve the performance of software.

There is a need for a mechanism that can perform path profiling while overcoming the acyclic and intraprocedural path limitations. There is a need for a mechanism to represent the entire flow control of an execution of a program. There is a need for a mechanism to represent the entire flow control of an execution of a program in a manageable format. There is a need for a mechanism to identify the most important parts of that representation so programmers can concentrate their efforts to improve those parts while providing the greatest benefit.

SUMMARY OF THE INVENTION

A program is instrumented to record acyclic paths during execution of the program. As the instrumented program is executed, an executed path trace is created. A whole program path is produced from the executed path trace. The whole program path is a complete compact record of a program's entire control flow. It includes a record of crossing loop boundaries and procedure boundaries to provide a complete picture of the program's dynamic behavior.

A path profiling tool is used to instrument the program with code to produce a trace of executed acyclic paths. An accumulator is incremented by predetermined amounts by such code along a select set of edges in a program's control-flow graph. At the end of an acyclic path, the value in the accumulator uniquely identifies the executed path. The path leading to a call site is recorded in the trace before any paths executed by a callee.

An algorithm is used to compress the path trace and uncover its regular structure. It comprises a string compression algorithm that constructs a context-free grammar for its input. The algorithm is of a type which has been used to find hierarchical structures in a variety of sequences, ranging from DNA sequences to genealogical database. It uses the insight that log N rules can generate N occurrences of a subsequence. The grammar used requires fewer symbols while explicitly capturing repetitions of selected patterns in a context free manner. The grammar is then compressed by representing strings of symbols which are unique identifiers for an acyclic path. The product of the compression is a directed acyclic graph referred to as a whole program path. This whole program path is not only a compact and lossless representation of the program's dynamic flow control, but is also a convenient representation for analysis.

Heavily executed subpaths may be easily identified from the representation. The whole program path is traversed to find the hot subpaths according to input parameters of minimum and maximum path lengths and minimum cost.

Directed acyclic graphs are also used to represent entities such as instructions, statements, basic blocks, memory addresses and acyclic paths as nodes, and the execution of such entities as edges between such nodes.

The present invention describes systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 4 is a sample table of byte code-operand pairs in an executed path trace.

FIG. 5 is a pseudocode representation of a compression algorithm for producing a whole program path from an acyclic path trace.

FIGS. 8A and 8B are a pseudocode representation of an algorithm for finding hot subpaths.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into three sections. In the first section, the hardware and the operating environment in conjunction with which embodiments of the invention may be practiced are described. In the second section, and overview of the generation of a whole program path from a selected program is described, including the compression of a trace to form the whole program path, as well as uses of the path to identify hot subpaths. Finally, in the third section, a conclusion of the detailed description is provided.

HARDWARE AND OPERATING ENVIRONMENT

Figure 1:
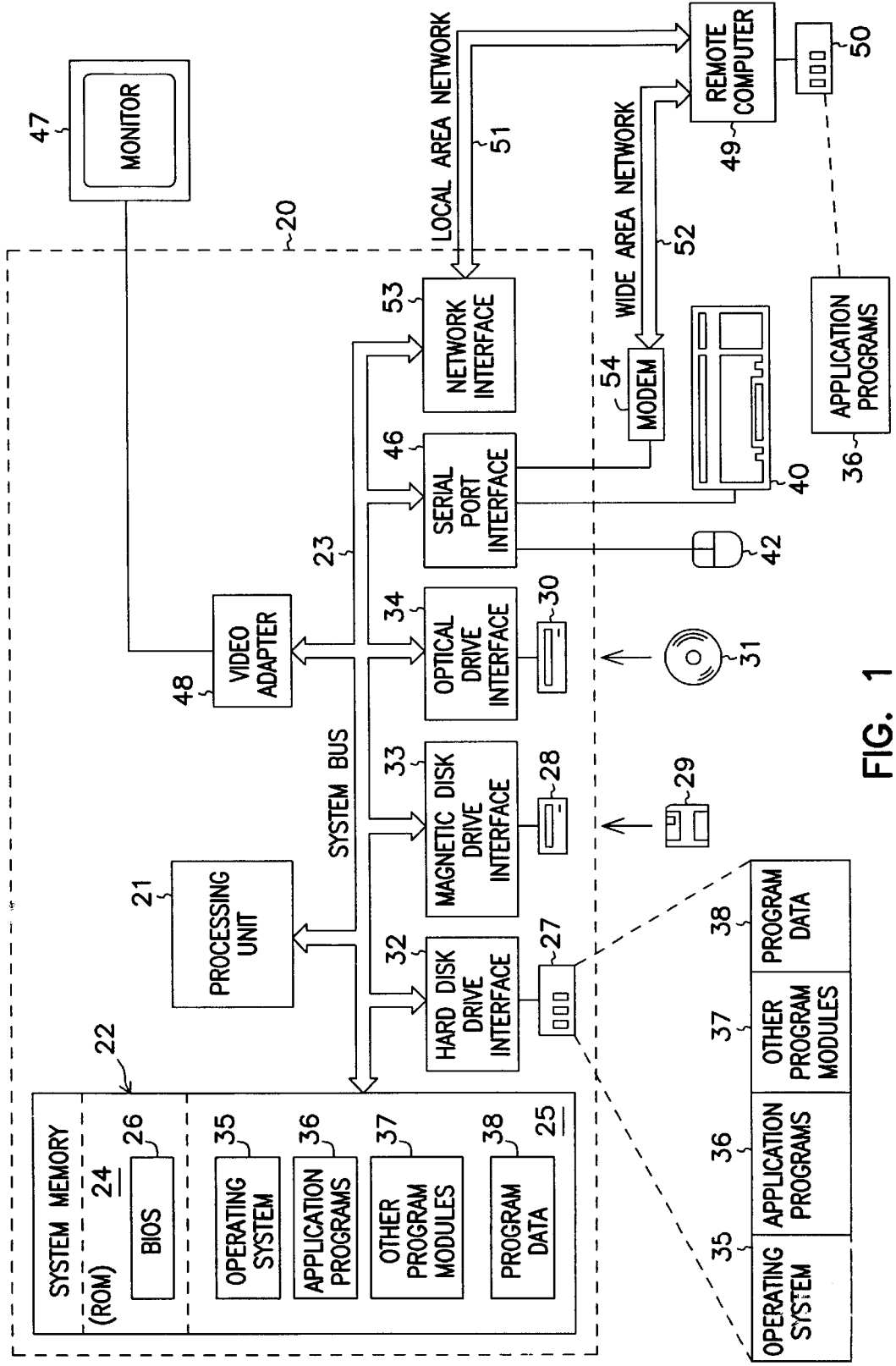
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

EXEMPLARY EMBODIMENTS

A system level overview of the operation of an exemplary embodiment of the invention is described by reference to FIG. 2. This system can be used on application programs 36 from FIG. 1 to produce the complete flow control of an execution of that program. This system can also analyze the complete flow control and find the most heavily used portions.

Figure 2:
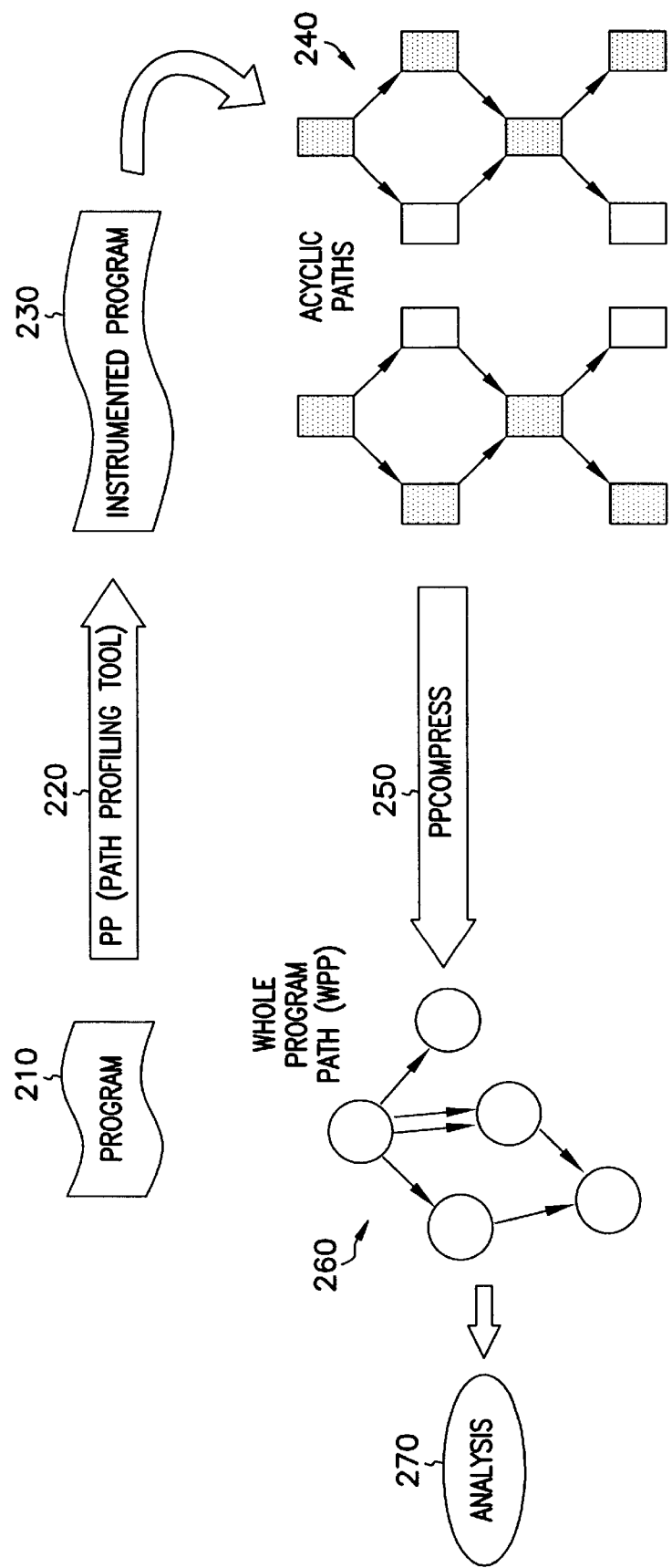
FIG. 2 is a system block diagram illustrating generation of a whole program path from a selected program.

FIG. 2 provides an overview of a system for creating whole program paths. Further details of each of the elements will be provided with reference to succeeding figures. A selected program 210 is instrumented with code by means of a path profiling tool 220 to produce an instrumented program 230. The instrumentation is done to record a representation of acyclic paths 240 executed during running of the program. The tool adds code to increment an accumulator by predetermined amounts along a select set of edges in a routine's (program's) control-flow graph. At the end of an acyclic path, such as at a routine's exit or loop back edge, the value in this accumulator uniquely identifies the executed path. This value is then appended to a trace of executed paths. The paths are then processed by a path profile compress, PPCompress, tool 250 to produce a whole program path as represented at 260. The whole program path representation 260 is in a form suitable for analysis at 270 to find performance bottlenecks or program errors.

Figure 3:
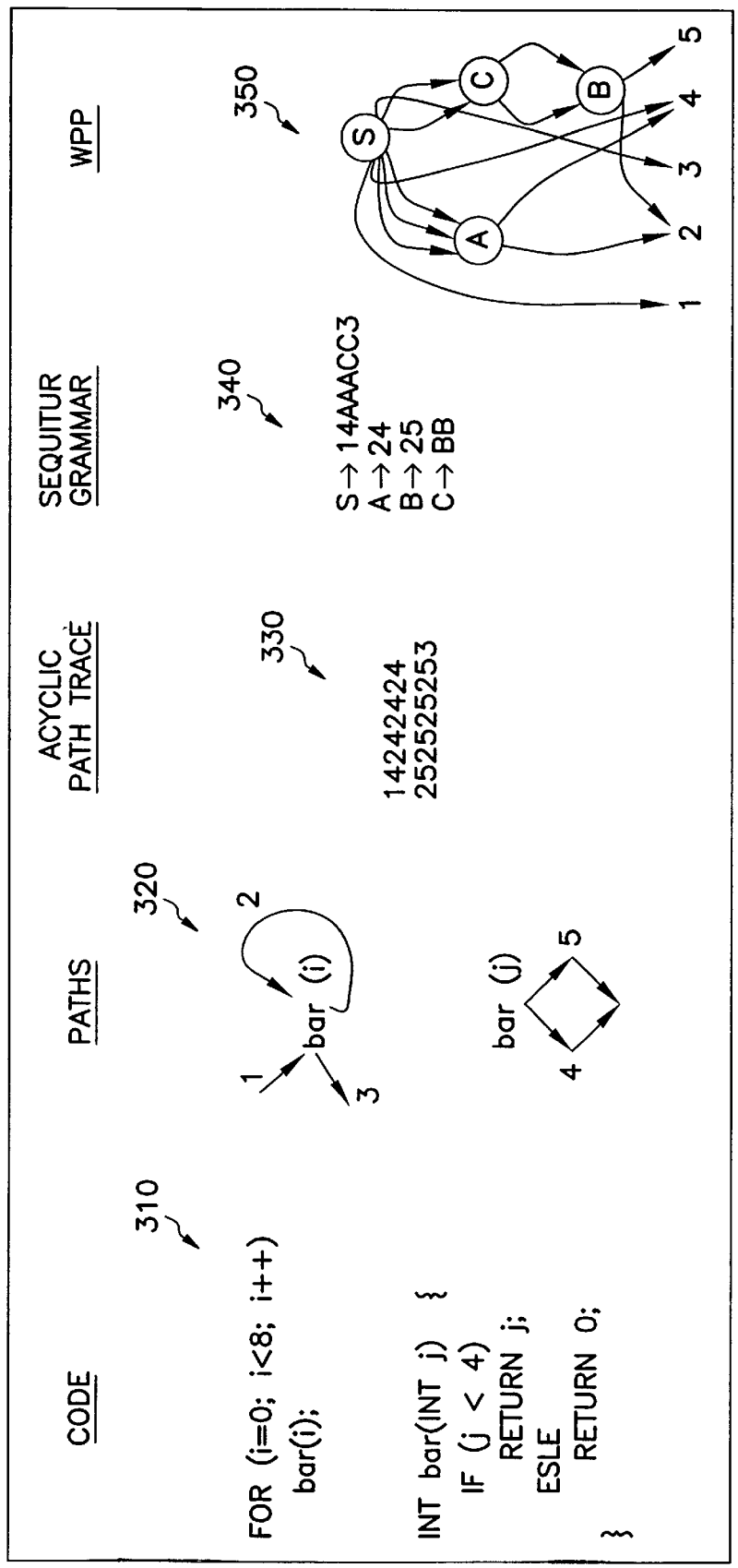
FIG. 3 is a diagram showing sample code for the system of FIG. 2 showing further detail of data structures at each step of the production of the whole program path.

In FIG. 3, a sample code loop is shown at 310. The loop executes nineteen acyclic paths labeled 1 through 5 as represented at 320. The entrance paths and exit paths are represented by a "1" and a "3" respectively. A path labeled 2 corresponds to the for statement, and the incrementing of "i" between zero and eight. When j is less than four, path 4 is taken, otherwise path 5 is taken. The path trace is represented at 330, wherein the sequence of numbers correspond to the numbers identified in the paths 320. As can be seen, the routine is entered once, corresponding to the "1" at the beginning of the trace, and a "3" at the end of the trace. PPCompress 250 creates a grammar as indicated 340, which it then uses to generate a whole program path representation at 350. The grammar is used to create a very compact representation of the trace in the form of a directed acyclic graph at 350. The grammar for this simple program consists of four symbols or letters, S, A, B, and C. The grammar is defined in terms of the paths 1 through 5, in addition to the letters themselves as seen. Thus, A is defined as the string of paths 24. B is defined as 25. C is defined as BB, or 2525. S is then used to represent a long string of 14AAACC3.

Whole program profiling requires a slight redefinition of a path from prior paths, so edges leading into a basic block containing a procedure call terminate acyclic paths. This change reduces the average path length, and so increases the size of a path trace. It is however necessary to ensure that the path leading to a call site is recorded in the trace before any paths executed by the callee. The path-profiling algorithm truncates paths with the mechanism originally used to terminate paths at loop backedges and to cut paths to limit the size of path identifiers.

The executed path trace contains a sequence of byte code-operand pairs representative of acyclic paths. Examples of these are shown in FIG. 4. A first opcode comprises EnterRoutine(ID), which identifies the beginning of the routine, and that subsequent paths execute in routine ID. A LeaveRoutinie( ) opcode is used to identify that the current routine is left and a previous routine is returned to. A NewPath(ID) opcode is used to identify an executed Path ID, and an EnterThread(ID) means that subsequent paths execute in thread ID. The run-time instrumentation tracks non-local returns (setjmp/longjmp and exceptions), to produce the correct number of LeaveRoutine operations. Several variants of each opcode-e.g., byte, short, and word—reduce the size of a trace. The trace is reasonably compact, as most paths require only three bytes (an opcode and a short path ID). Further variations of these codes may be implemented.

The executed path trace is generally very large. For example, an SQL database system running a TPC-C benchmark for 120 seconds produced 629 MB of trace.

PPCompress 250 receives the executed path trace and outputs a whole program path. The trace may be received real time and compressed, or it may be stored and then accessed by PCCompress 250 as desired. PPCompress 250 compresses the executed path trace to produce a smaller and manageable representation that also uncovers its regular structure. This is accomplished by compressing the stream of acyclic paths, the executed path trace, into a context-free grammar as shown above, that produces exactly the program's path. The resulting grammar both reflects hierarchical structure in the input string and is typically far more compact than the original path trace. The directed acyclic graph representation of this grammar is the whole program path. The whole program path contains the program flow including crossing loop boundaries.

The compression algorithm that may be used by the PPCompress 250 is a modification of a SEQUITUR algorithm. For information regarding the SEQUITUR algorithm, see C. G. Nevill-Manning and I. H. Witten, "Compression and explanation using hierarchical grammars," The Computer Journal, vol. 40, pp. 103–116, 1997. The SEQUITUR algorithm identifies hierarchical structure in sequences of discrete symbols and uses that information for compression. The algorithm performs well at both compression and structural inference and produces comprehensible descriptions of sequence structure in the form of grammar rules. The algorithm operates incrementally and the structure represents the input at all times. It can be implemented efficiently and operates in a time that is nearly linear in sequence length. It associates, with every symbol, a map of the symbols that immediately follow. This map, which is keyed on the second symbol, returns a digram. These maps are implemented as unbalanced binary trees, which typically run in time logarithmic in the number of digrams in which a symbol occurs first. A digram is a pair of symbols. The worst case behavior of this code is $O(N^2)$, which is unlikely to occur in this application, as any path is followed by at most a small number of other paths.

The SEQUITUR algorithm is used with a modification to it to compress the executed path trace into the whole program path. The modification involves looking ahead a single symbol before introducing a new rule to eliminate a duplicate digram. A pseudocode representation of the modified SEQUITUR algorithm is shown in FIG. 5. The modified algorithm takes a string as input. Each repetition in the string gives rise to a new rule in the grammar and is replaced by a non-terminal symbol. LHS is the left side or non-terminal side of a grammar production. RHS is the right side of the production. This is clearly shown in FIG. 3 at grammar 340, where the individual S, A, B, and C are on the left side, with the other symbols comprising the right side. In the pseudocode representation, two while statements are used to control the flow of the algorithm. The first loops through input characters corresponding to the trace while there are more characters to process. c is defined as the next input character and is appended to the start of a rule, S. The second loop is performed while property is violated to create new rules and compress the trace into the grammar.

Although the resulting grammars are compact, they are improved by looking ahead a single symbol before introducing a new rule to eliminate a duplicate digram. Assume that the rightmost symbols of the start rule, which form a duplicate digram are x and y and the look-ahead symbol is 1. If the look-ahead symbol forms a digram with the second symbol of the duplicate digram and this digram, y1, is the right side of an existing rule, then do not introduce a new rule to eliminate the duplicate digram. Instead, read the next symbol and apply the existing rule. This change does not affect the time bound on the algorithm, and in practice seems to produce slightly smaller grammars.

As an example, consider the string: 111112111111. S is first started as 1111, and A is created as 11. Then S is set to AA1211 by applying A. At the next step, the look-ahead character is 1. Since 11 (the second character of the duplicate digram and the next character) is the right side of A→11, a new rule is not introduced. Instead, the rule A→11 is applied resulting in the string: S-AA22AA. The look-ahead character is again 1, but no digram A1 is known, so the algorithm introduces a new rule B→AA, which leads to the grammar:

S→C2C
A→11
C→AA1

PPCompress 250 uses the SEQUITUR algorithm to compress an acyclic path trace. Sequitur operates on a string of symbols. A symbol is a unique identifier for an executed acyclic path. As each previously unknown (routine id, path id) pair appears in the input stream, it is assigned a unique identifier. PPCompress imposes no limits on these symbols, beyond the space needed to maintain a hash table that is used to record the mapping. In practice, programs execute relatively few paths (tens of thousands at the most), so the number of symbols and the size of their identifiers remains manageable.

Grammars are typically represented as trees. However, whole program paths are directed acyclic graphs (DAGs) since forming a tree would decompress a grammar into a string comparable in size to the path trace. Interior nodes in the DAG represent grammar productions. They are labeled with the non-terminal symbol from the left side of the production. Exterior nodes are terminal symbols (acyclic paths). An edge from node A to node B represents an occurrence of rule B in the right hand side of rule A. A node's successors are ordered in the same manner as symbols in corresponding rule's right hand side.

Figure 6:
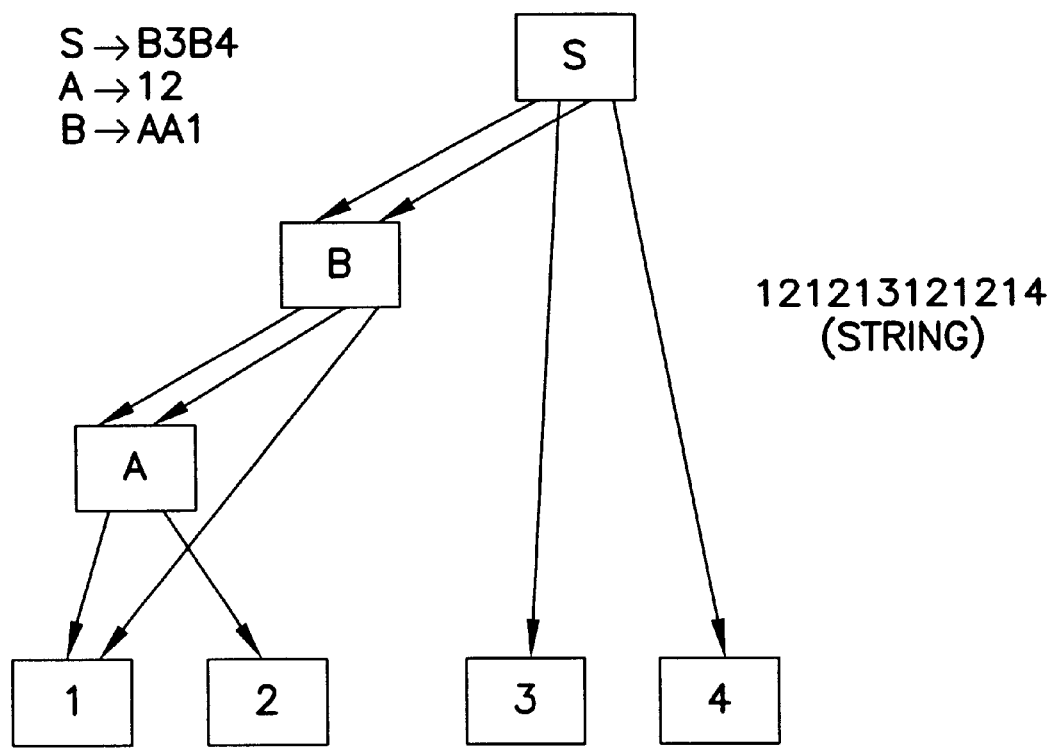
FIG. 6 is an example of a whole program path and grammar for a selected string.

The DAG representation is convenient to analyze. A sequence of executed paths can be recovered by traversing the DAG. Consider for example the string 121213121214 (path 1 might be a loop backedge, and other paths different traces through the loop body). FIG. 6 shows its grammar and whole program path. Repetitions of an acyclic path or sequence of acyclic paths appear in a whole program path as multiple DAG paths from a node containing a non-terminal to another DAG node. For example, node B corresponds to two executions of path 12 followed by path 1.

Many interesting questions about a program's behavior can be answered directly from a whole program path. For example, acyclic path p executes before path q if there exists a common ancestor of both nodes in which an in order traversal reaches p before q. Another useful analysis is the dynamic execution context of code, such as its routine or loop iteration. This context is the paths that execute before and after the code. These paths arc neighbors along the fringe of the DAG and are easily found by traversal.

The execution frequency of a sequence of acyclic paths is the number of times that prefix of this sequence is executed immediately before the suffix of the sequence. Sequences, such as ab or abc in FIG. 7, that have a least common ancestor (LCA) in the whole program path have the same execution frequency as this node. The execution frequency of a node is the number of paths in the DAG from the start symbol to the node (the numbers in FIG. 7). Other sequences, such as CA, do not have an LCA as they arise form the repetition of a subsequence, in this case A (which starts with path a and ends with c). Their frequency can be computed from the frequency of consecutive edges leading into the LCA of the subsequence (node A).

Since whole program paths represent all executions of an acyclic path as a single terminal node, it is not possible to record distinct metrics for each execution of a path. For example, a path trace could associate metrics from hardware performance counters (e.g., cycles, stalls, cache misses, etc.) with each path. PPCompress 250 does not directly maintain these metrics from different path executions, but instead summarizes them by aggregating values into a path's terminal symbol. This aggregation is not always disadvantageous, as it helps eliminate "noise" in performance data.

Collective metrics, such as the number of instructions along a path, the average number of cycles executed along the path, or the average number of cache misses along the path, are suitable for aggregation. Individual metrics, such as the number of cache misses in a particular execution, cannot be captured in a whole program path. However, context-sensitive metrics such as the number of cache missed in b after it executes path a, can be handled by associating costs with interior nodes.

A whole program path captures a program's entire dynamic control in its DAG. This structure can be analyzed in many ways. Previous path profiling work found that a small collection of hot subpaths typically dominate a program's execution. Whole program paths provide the opportunity to find longer and more complete paths that cross procedure and loop boundaries. Whole program paths can also be analyzed to find other dynamic program properties.

The analyzer 270 analyzes the control flow of a program by analyzing the whole program path. One embodiment uses the analyzer to find "hot subpaths" in a program. A hot subpath is a short sequence of acyclic paths that is costly, either because the subpath is frequently executed or because operations along it are disproportionately expensive. An article, Ammons, Ball, and Larus, "Exploiting Hardware Performance Counters with Flow and Context Sensitive Profiling," in Proceedings of the SIGPLAN '97 Conference on Programming Language Design and Implementation, 1997, showed that relatively few hot subpaths incurred a substantial fraction of a program's execution cost. Thus, performance can be greatly increased by maximizing performance of the hot subpaths. The hot subpaths can be found from a variety of parameters. In one embodiment, the analyzer 270 finds all subpaths (a consecutively executed sequence of acyclic paths) with a cost or at least one predetermined amount and a length of at most a second predetermined amount. A string X is a subpath of a whole program path grammar G if X is a substring of the string produced by G: $\alpha X\beta=L(G)$ where $\alpha,\epsilon T^*$, $L(G)$ is the string produced by G, and T is the set of terminals (acyclic paths). All of the subpaths that meet those predetermined amounts are output as hot subpaths.

In another embodiment, a hot subpath is a sequence of L or fewer consecutively executed acyclic paths that incur a cost of C or more. A subpath's cost is it execution frequency multiplied times the sum of its constituent acyclic paths' costs. A minimal hot subpath is the shortest prefix of a subpath with cost of C or more. Minimal hot subpaths are of interest, since longer hot subpaths are easily found by adding acyclic paths to a minimal subpath.

Figure 7:
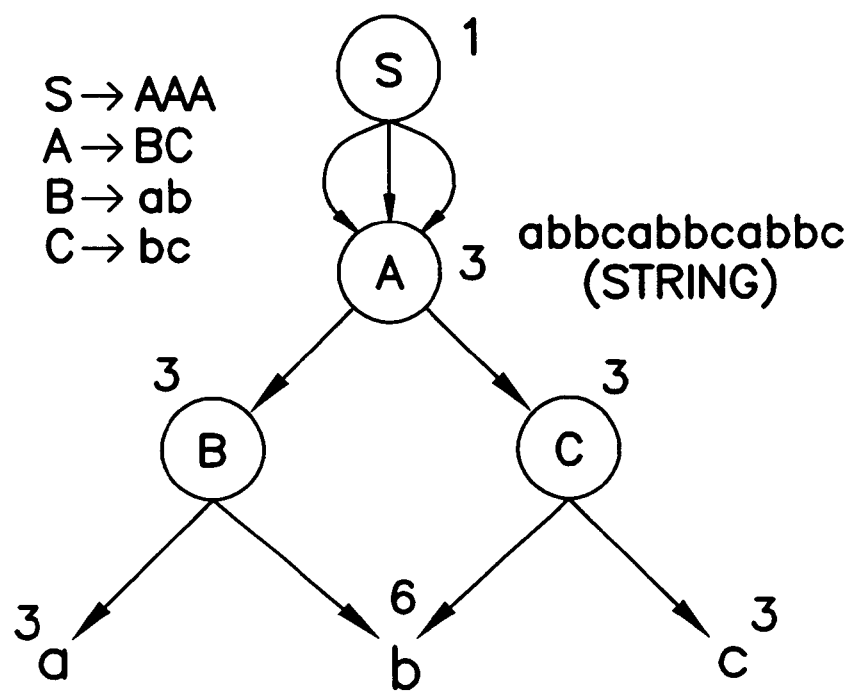
FIG. 7 is a further example of a whole program path and grammar for a selected string.

Consider the example of FIG. 7 which shows a whole program path and grammar for the string abbcabbcabbc, which might be part of a larger whole program path, as the rule utility property would otherwise eliminate symbols B and C. The whole program path shows execution frequencies as numbers. The grammar symbols comprise S, A, B, and C. Suppose that each acyclic path a, b, and c has a cost of 1 and that hot subpaths of length greater than one and less than four whose cost is 6 or more are desired. The whole program path contains four overlapping hot subpaths: ab, be, bb, and ca. In one embodiment, two hot subpaths, ab and bc are identified. The other two can be found by extending these two.

Pseudocode describing programming for implementing an algorithm for finding miminal hot subpaths whose length is between MinStringLength and MaxStringLength and cost greater than MinCost is shown in FIGS. 8A and 8B. A postorder traversal of the DAG is performed, visiting each node once. At each interior node, each subpath formed by concatenating the subpaths produced by two or more of the node's descendents is examined. The algorithm examines only concatenated strings, as the hot subpaths produced solely by a descendent node are found by a recursive call.

Figure 9:
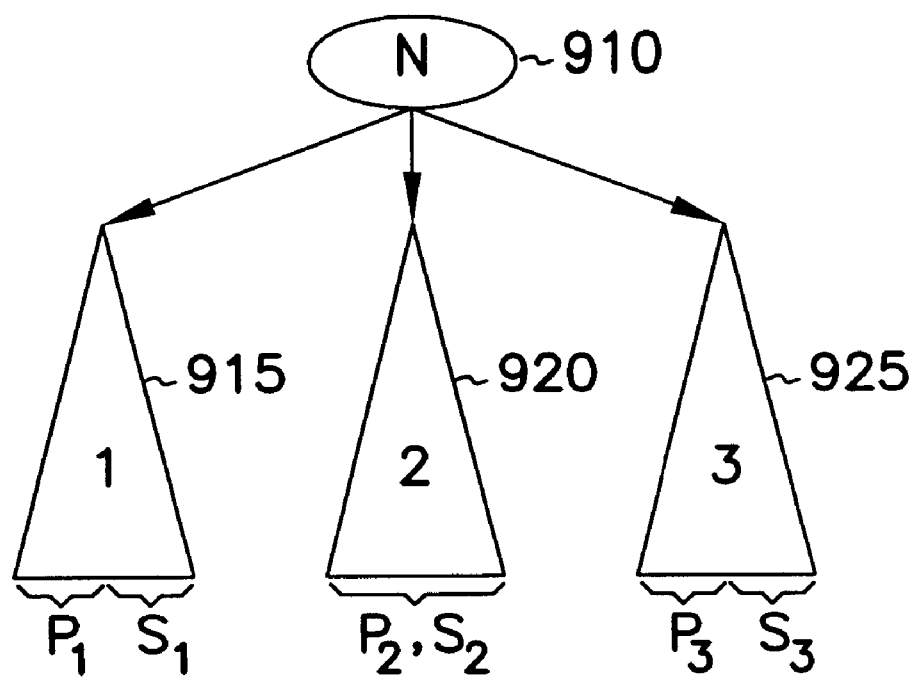
FIG. 9 is an example of a node in a whole program path with descendents.

As seen in FIG. 9, a node N at 910 in a whole program path is shown with descendents 915, 920 and 925. Viewed as a grammar, each of its successors (i.e. rules) produces a string (consisting of acyclic paths). Let Pi be the L-limited prefix of the string derived by successor i and let $S_i$ be the L-limited suffix of the string. An L-limited string is a string containing L or fewer symbols. A node's prefix is the first L symbols that it produces, and its suffix is the last L symbols.

Note that a node's prefix and suffix are independent of its parents. In particular, the algorithm computes only once the prefix and suffix of a node with multiple predecessors-including multiple edges from the same node-which preserves the space and time benefits of the DAG representation.

In the example, the L-limited subpaths for node N at 910 are found in strings $S_1 \| P_2$, $S_2 \| P_3$, and possibly $S_1 \| P_2 \| P_3$ (if the string produced by the second successor is shorter than L symbols). The operator $\|$ is string concatenation. Similarly, the L-limited prefix and suffix of node N are the first and last L symbols examined when looking for substrings at node N.

This approach finds non-minimal subpaths. For example, if the suffix of a node ends with a hot subpath, it will be extended with symbols from the prefix of the next node. Changing the definition of a suffix corrects this problem. A node's suffix is the maximal suffix of the final L symbols that is not part of a hot subpath. The algorithm clears the subpath string when a hot subpath is found so that this string (which becomes the node's suffix) only contains symbols encountered after the last hot subpath. Similarly, a node's prefix subpath is maximal prefix of the first L symbols that is not part of a hot subpath. The algorithm freezes a node's prefix string at the first subpath.

Since subpaths are limited to length L or less, the amount of work performed at a node is proportional to the number of its successors. The algorithm of FIGS. 8A and 8B traverses each edge in the whole program path once and performs at most L operations per edge, so its running time is O(EL), where E is the number of edges in the whole program path. In the worst case the space used by this algorithm could be O(NL), where N is the number of nodes in the whole program path. However, there is no need to retain prefix and suffix strings for nodes whose predecessors have all been visited, and the code frees and reuses this space. In this case, the space requirement is proportional to the number of partially visited nodes in the DAG, which can be far lower than O(N).

These embodiments allow programmers and others to create a manageable representation of the control flow of an execution of a program. The representation of the whole program path, allows the flow of a program to be analyzed in any way that one wishes. One analysis is to identify the most heavily used or executed parts of a program. This allows a programmer to concentrate on only those areas to achieve the greatest performance boost for the time and cost put into developing software.

The methods and algorithms described may be performed by computer programs made up of computer-executable instructions. Describing them by reference to a flowchart or pseudocode enables one skilled in the art to develop such programs including such instructions to carry out the methods on suitable computers executing the instructions from computer-readable media.

Conclusion

A whole program path has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The various embodiments allow the recording of the entire control flow that a program follows during execution. This results in a highly compressed and useful representation of the control flow called a whole program path. The whole program path crosses both loop and procedure boundaries, forming a practical basis for true interprocedural path profiling. The whole program path can be used to help identify program errors. One use of this representation is to analyze it for hot subpaths. By finding hot subpaths, programmers and others can modify their programs so that such paths run faster.

Directed acyclic graphs can also be produced using different methods than by means of a modified SEQUITUR algorithm. Further, it may also be used to represent data references in many different contexts, and also may be used to represent flow control. The directed acyclic graphs are compact and easily manipulated. In one embodiment, a program's control flow is represented as a directed acyclic graph in which nodes in the graph represent either instructions, statements, basic blocks, or acyclic paths. Edges of the directed acyclic graph represent executions of these entities. This allows the identification of hot sequences of such entities in the same manner as described above. Still further, a program's address trace (sequence of referenced memory locations) is represented as a directed acyclic graph in which nodes represent locations and edges represent executions of such entities. This type of graph provides for an easier way of determining frequent memory accesses to locations in memory.

We claim:

1. A method for creating a whole program path comprising:
    instrumenting a program to record a trace of acyclic paths executed by the program;
    executing the program to create such paths; and
    producing the whole program path from the executed path trace wherein the whole program path represents crossing loop boundaries.

2. The method of claim 1 further comprising analyzing the whole program path to produce hot subpaths.

3. The method of claim 1 wherein instrumenting a program further comprises adding code along a subset of edges in each routine's control flow graph which increments an accumulator by a predetermined value such that at the end of an acyclic path, a value in the accumulator uniquely identifies an executed path.

4. The method of claim 1 wherein producing the whole program path from the executed path trace comprises compressing the executed path trace to produce the whole program path.

5. The method of claim 1 wherein the whole program path is represented as a directed acyclic graph.

6. The method of claim 1 and further comprising collecting path metrics while executing the program.

7. The method of claim 6 wherein the metrics are selected from the group consisting of frequency of execution of a path, number of instructions along a path, average number of cycles along a path, average number of cache misses, and actual number of cache misses in a selected path after execution of a path.

8. A computer-readable medium having computer-executable instructions for performing the method recited in claim 1.

9. A system comprising:
    an instrumentation tool to add instructions into a program;
    an execution unit coupled to the instrumentation tool to execute the program and output an executed path trace; and
    a compression unit coupled to the execution unit that receives the executed path trace and outputs a whole program path.

10. The system of claim 9, further comprising an analyzer coupled to the compression unit that receives the whole program path and outputs hot subpaths.

11. The system of claim 9, wherein the instrumentation tool adds code along a subset of edges in each routine's control flow graph which increments an accumulator by a predetermined value such that at the end of an acyclic path, a value in the accumulator uniquely identifies an executed path.

12. The system of claim 9, wherein the compression unit uses an on-line algorithm on the executed path trace to produce the whole program path.

13. The system of claim 9, wherein the whole program path is represented by a directed acyclic graph.

14. The method of claim 13 and further comprising collecting path metrics while executing the program.

15. The method of claim 14 wherein the metrics are selected from the group consisting of: frequency of execution of a path, number of instructions along a path, average number of cycles along a path, average number of cache misses, and actual number of cache misses in a selected path after execution of a path.

16. A method for analyzing a whole program path to find hot subpaths comprising:
    inputting input parameters;
    searching through the whole program path to find the hot subpaths according to the input parameters; and
    outputting the hot subpaths.

17. The method as in claim 16, wherein the input parameters comprise a minimum and maximum path length and a minimum cost.

18. A method for producing a whole program path comprising:
    (1) inputting a program trace as a string;
    (2) appending a next input character to a start rule;
    (3) if a digram is a duplicate digram, replacing the digram by an existing rule and if no existing rule, creating a new rule and replacing the digram by the new rule after looking ahead a single character before introducing the new rule to eliminate the duplicate digram;
    (4) if the rule is only referenced once, replacing the rule by representation of the rule; and
    (5) returning to (2) upon determining that the next input character is not empty.

19. A computer readable medium having a directed acyclic graph stored thereon for representing a whole program path, the directed acyclic graph comprising:
    interior nodes corresponding to non-terminals; and
    exterior nodes corresponding to acyclic paths wherein each node is connected to at least one other node.

20. The computer readable medium of claim 19 wherein the directed acyclic graph further comprises a metric selected from the group consisting of frequency of execution of a path, number of instructions along a path, average number of cycles along a path, average number of cache misses, and actual number of cache misses in a selected path after execution of a path.

21. The computer readable medium of claim 19 wherein the data structure further comprises at least one metric selected from the group consisting of frequency of execution of a path, number of instructions along a path, average number of cycles along a path, average number of cache misses, and actual number of cache misses in a selected path after execution of a path.

22. A computer-readable medium having stored thereon a data structure for representing a whole program path, comprising:
    interior nodes corresponding to non-terminals wherein each node is connected to at least two other nodes; and
    exterior nodes corresponding to acyclic paths wherein each node is connected to at least one other node.

23. A computer-readable medium having computer-executable instructions for creating a whole program path for causing a computer to perform a method comprising:

instrumenting a program to record a path executed by the program;

executing the program to create an executed path trace;

producing the whole program path from the executed path trace wherein the whole program path includes crossing loop boundaries; and analyzing the whole program path to produce hot subpaths.

24. A computer-readable medium having computer-executable instructions for analyzing a whole program path to find hot subpaths comprising:

inputting input parameters;

searching through the whole program path to find the hot subpaths according to the input parameters wherein the input parameters comprise a path length and a cost; and outputting the hot subpaths.

25. A computer-readable medium having computer-executable instructions comprising:

(1) inputting a program trace as a string of characters;

(2) appending a next input character to a start rule;

(3) if a digram is a duplicate digram, replacing the digram by an existing rule and if no existing rule, creating a new rule and replacing the digram by the new rule after looking ahead a single character before introducing the new rule to eliminate the duplicate digram;

(4) if the rule is only referenced once, eliminating the rule;

(5) return to (2) upon determining that the next input character is not empty; and (6) outputting a whole program path wherein the whole program path represents the flow of a program execution.

26. A method for creating a whole program path comprising:

executing a selected program to create a trace of acyclic paths which are executed; and producing a whole program path from such trace of acyclic paths, wherein the whole program path represents crossing loop boundaries.

27. The method of claim 26, wherein the trace of acyclic paths is provided for production of the whole program path as it is generated.

28. The method of claim 26 wherein a unique identifier is used to represent an executed acyclic path.

29. The method of claim 26 wherein the whole program path comprises a directed acyclic graph.

30. The method of claim 29 wherein the whole program path comprises context sensitive metrics associated with interior nodes of the directed acyclic graph.

31. The method of claim 26, wherein digrams are defined as pairs of consecutive symbols, each of which represent an acyclic path, and wherein diagrams having more than one occurrence are represented by a non-terminal symbol.

32. The method of claim 26, wherein all non-terminal symbols which are only referenced once are eliminated.

33. The method of claim 26 wherein the whole program path is produced in a nearly linear manner and comprises a context-free grammar.

34. The method of claim 26 wherein the whole program path comprises at least one metric selected from the group consisting of frequency of execution of a path, number of instructions along a path, average number of cycles along a path, average number of cache misses, and actual number of cache misses in a selected path after execution of a path.

35. The method of claim 26, wherein the production of the whole program path further comprises compressing the trace.

36. A computer readable medium having instructions stored thereon to cause a computer to perform a method for creating a whole program path comprising:

executing a selected program to create a trace of acyclic paths which are executed; and producing a whole program path from such trace of acyclic paths, wherein the whole program path represents crossing loop boundaries.

37. A computer readable medium having a representation of a program stored thereon, said representation including a directed acyclic graph comprising:

a plurality of nodes representative of entities in the program; and a plurality of edges connecting said nodes, the edges representing executions of such entities.

38. The computer readable medium of claim 37, wherein the entities are selected from the group consisting of instructions, statements, basic blocks, memory addresses and acyclic paths.

39. A method of representing an address trace of a computer executed program, the method comprising:

representing memory locations as nodes of a directed acyclic graph; and representing executions of entities in said memory locations as edges of the directed acyclic graph.

40. A computer readable medium having instructions stored thereon for causing a computer to implement the method of claim 39.

\* \* \* \* \*

UNITED STATES PATENT AND TRADEMARK OFFICE
CERTIFICATE OF CORRECTION

PATENT NO.    : 6,327,699 B1
DATED         : December 4, 2001
INVENTOR(S)   : Larus et al.

It is certified that error appears in the above-identified patent and that said Letters Patent is hereby corrected as shown below:

Column 3,
Line 24, replace "and" with -- an --

Column 4,
Line 6, replace "." with -- , --

Column 6,
Line 43, replace "LeaveRoutinie()" with -- LeaveRoutine() --

Column 7,
Line 65, "S-AA22AA" with -- S-AA12AA --

Column 9,
Line 31, replace "a,∈T*" with -- a,ßET* --
Line 51, replace "be" with -- bc --
Line 67, replace "Pi" with -- $P_i$ --

Column 12,
Lines 12 and 14, replace "method" with -- system --

Signed and Sealed this

Seventh Day of October, 2003

JAMES E. ROGAN
*Director of the United States Patent and Trademark Office*